Nov. 18, 1958 R. L. FRANCIS ET AL 2,860,476
ARTICULATED RADIATOR SHIELD FOR CENTER DIVIDER OF CORN PICKER
Filed Feb. 12, 1958 3 Sheets-Sheet 1
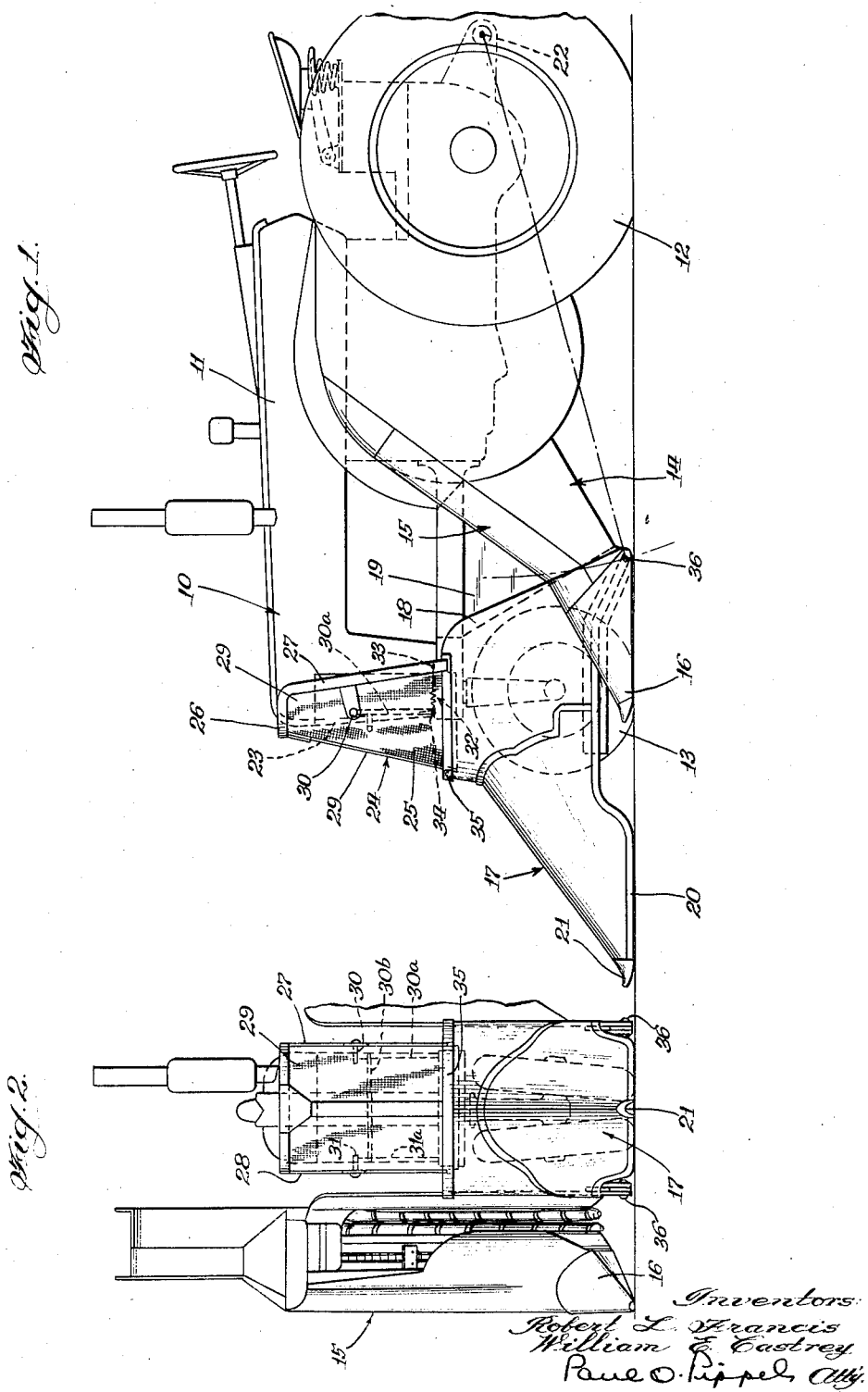

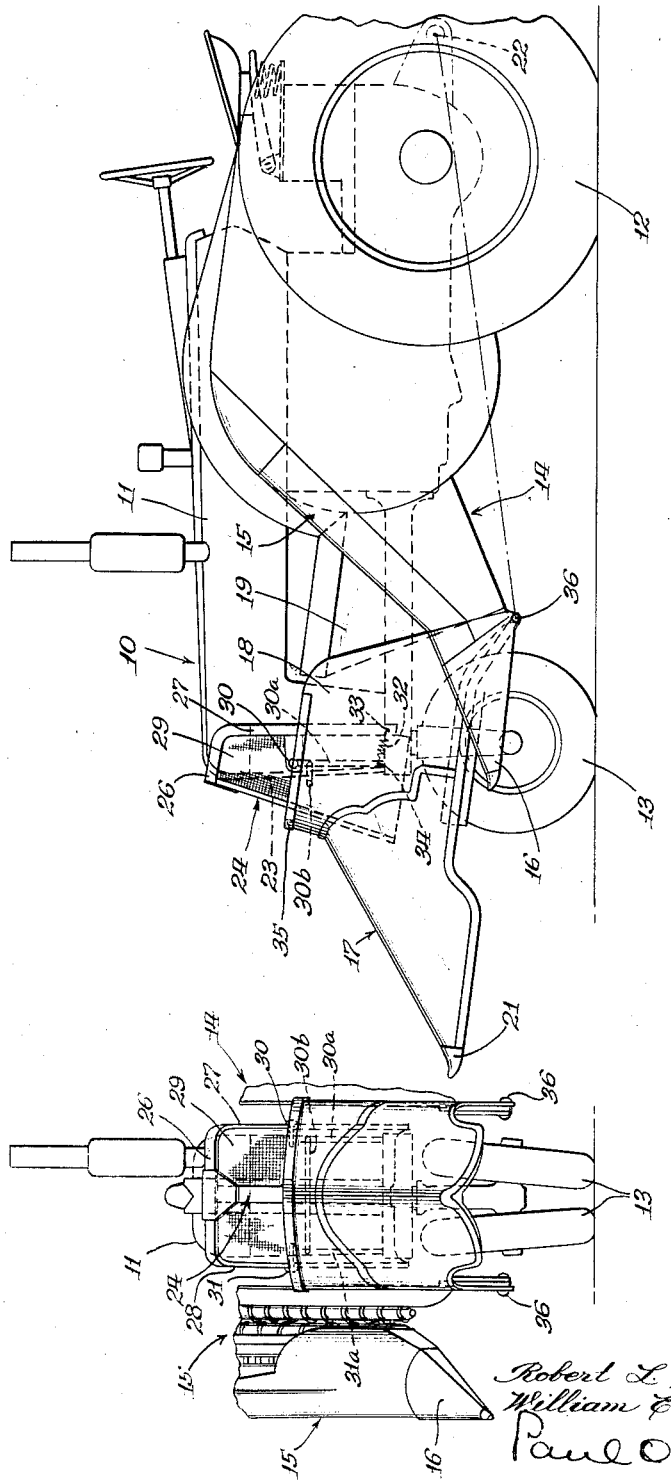

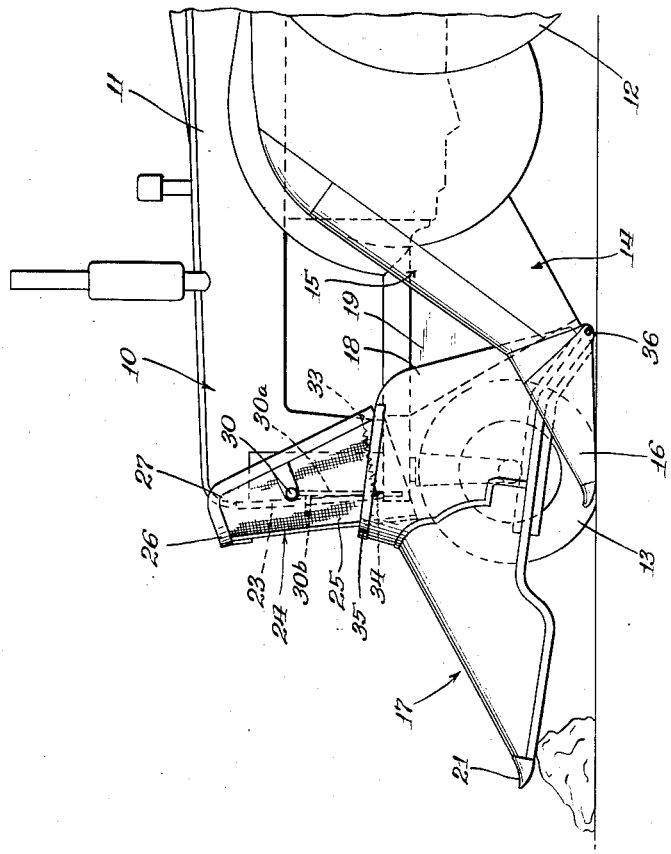

United States Patent Office 2,860,476
Patented Nov. 18, 1958

2,860,476

ARTICULATED RADIATOR SHIELD FOR CENTER DIVIDER OF CORN PICKER

Robert L. Francis, East Moline, Ill., and William E. Castrey, San Diego, Calif., assignors to International Harvester Company, Chicago, Ill., a corporation of New Jersey Application February 12, 1958, Serial No. 714,886

5 Claims. (Cl. 56—119)

This invention relates to a new and improved articulated radiator shield for cooperation with the center divider of a corn picker.

The center divider or crop elevating and deflecting member which is disposed forwardly of and around the steerable wheels of a tricycle type tractor present many problems. The function of a center divider is to raise corn stalks which have been blown or otherwise knocked down and thereupon elevate the stalks by deflecting them upwardly over the inclined surface of the center divider and guide them into the corn picker gathering units on either side of the tractor on which the corn picker is mounted. The center dividers thus constitute a big shield member which is adapted to house or cover the steerable wheels of the tractor and at the same time scoop up down stalks and simultaneously guide upright stalks which may be slightly off row into the corn harvesting mechanisms on either side of the center divider. The center divider gets its name from the dividing or separating of adjacent rows of corn for delivery into adjacent harvesting mechanisms and thus eliminating an intermixing of the stalks from the two rows. The tractor engine radiator is generally positioned at the forward end of the tricycle type tractor above the front steerable wheels thereof. In all crop harvesters there is the constant problem of maintaining a radiator shield for an engine substantially clear of leaf or trash matter which tends to cling to the radiator and thus cause it to clog and the engine to overheat. Center dividers for tractor mounted corn pickers have been made with integral upward extensions which cover or substantially cover the engine radiators, but this involves considerable bulkiness and weight which is undesirable. Also separate shields have been provided for engine radiators which in certain positions of the center divider effect a seal between the center divider and the radiator shield or screen whereas in tilted or pivoted positions of the center divider in its operation of following ground contour to scoop up down stalks there is a substantial gap between the center divider top and the radiator shield or screen through which ears of corn are often lost thus attributing an inefficiency to the corn pickers.

It is, therefore, a principal object of the present invention to provide an articulated combination of radiator shield and corn picker center divider whereby the arrangement permits a substantial sealing between the elements throughout all positions of adjustment of the center divider.

An important object of this invention is the provision of means in a tractor mounted corn picker having a crop raising and deflecting means at the front center thereof and cooperating with a radiator shield for the tractor engine whereby regardless of the angular position which the crop raising and deflecting means may assume, there is a minimum or no space between that element and the radiator shield.

Another and further important object of this invention is to supply a radiator shield for tractor mounted corn pickers in which the radiator shield is disposed forwardly of the picker and is hingedly mounted so that it may yield rearwardly at its lower side in cooperation with a hinged center divider for the corn picker whereby when the center divider is raised or lowered there will be no space between the center divider and the shield through which corn could be lost.

Still another important object of this invention is to equip a tractor mounted corn picker with a spring extended radiator shield arranged and constructed to cooperate with a hingedly mounted center divider so that the two elements are articulated relative to each other with a subtsantial sealing therebetween.

Other and further important objects and advantages will become apparent from the following specification and accompanying drawings.

In the drawings:

Figure 1 is a side of a tractor mounted corn picker incorporating the principles of this invention;

Figure 2 is a front elevational view of the device as shown in Figure 1;

Figure 3 is a side elevational view of the tractor mounted corn picker of Figure 1 with the picker raised relative to the tractor;

Figure 4 is a front elevational view of the device of Figure 3;

Figure 5 is a partial side elevational view of the tractor mounted corn picker of this invention having the crop engaging center divider pivoted upwardly about its own hinge point separately from the hinging of the picker, as shown in Figure 3, and with the articulated radiator shield shown cooperating therewith; and Figure 6 is a front elevational view of the device shown in Figure 5.

As shown in the drawings, the reference numeral 10 indicates generally an agricultural tractor of the tricycle type in which there is included a generally longitudinally extending narrow body or engine 11 supported at its rear by widely spaced apart ground engaging traction wheels 12 and supported at its forward end by steerable wheels located at the center thereof as shown at 13. A corn picker 14 comprising a gathering unit 15 disposed between the elongated narrow body 11 of the tractor and one of the large traction wheels 12 is adapted to harvest standing corn stalks. The outside of the gathering unit is provided with an outer divider point 16 which is adapted to ride on the ground and cause any stalks lying thereon to be raised and fed into the gathering unit 15. At the center of the corn picker there is positioned a center divider 17 which is a crop elevating and deflecting mechanism which is similar to the outer divider 16 but is for the purpose of either shifting the stalks to one side or the other and to simultaneously shield the steerable wheels 13 of the tractor. In addition to picking up and guiding stalks rearwardly, the center divider 17 also provides an inner wall 18 which projects rearwardly to a position substantially overlying an inner wall 19 of the gatherer 15. The wall 19 may be termed an inner gatherer side sheet. This provides an uninterrupted surface against which the corn to be harvested may pass without fear of loss thereof. The center divider 17 has a runner-like structure 20 along the sides of the bottom for the purpose of following the contour of the ground. A central slightly upturned nose 21 assists in scooping down stalks up and dividing them by guiding the stalks from one side into the harvesting unit on that one side of the tractor or from the other side into the other corn harvesting unit in the event the corn picker employed is of the two-row type.

The corn picker is pivotally mounted at 22 on supporting means at the rear of the tractor. The corn picker 14 includes the gathering unit at each side of the tractor as well as the centrally disposed center divider 17 at the forward end thereof. The raised position of the corn picker is shown in Figures 3 and 4 wherein the entire machine is raised as just described about the hinge 22 spaced rearwardly of the tractor 10. This may generally be assumed to be a transport position wherein the user of the tractor mounted corn picker is traveling from one field to another or along a highway or other road. In operation, of course, it is desirable to have the corn picker lowered to the position shown in Figures 1 and 2 wherein both the outer dividers 16 and the center divider 17 ride on the ground so that all stalks regardless of whether they are standing upright or are down may be picked up and guided into the corn picker. This, of course, makes for more efficient harvesting of the corn.

In a tractor mounted corn picker of this type the engine 11 has its radiator or air intake at the forward end thereof as shown at 23. Without protection a radiator such as this and functioning on a harvesting machine is quite vulnerable to clogging by reason of leaves or small trash material which will tend to deposit thereon and thus cause a clogging of the air intake and an overheating of the engine. Thus, a shield of some sort is essential for radiators on harvesting machines. In the present device, a shield 24 is constructed of a screen-like material 25 and has an outer rigid framing 26 therearound. The radiator shield 24 is substantially U-shaped with rearwardly extending side portions 27 and 28 joined by a front portion which is inclined downwardly and forwardly as shown at 29. In other words, the U is enlarged as the shield progresses downwardly from top to bottom thereof. Pins 30 and 31 are in general alignment, as shown in Figure 2, but are spaced apart laterally. The pins form a fixed part of the rearwardly projecting walls 27 and 28, respectively, of the tapering U-shaped shield 24 and are journally mounted in the sides of the longitudinally extending narrow body or engine 11 of the tractor 10 closely adjacent the radiator 23 thereof. The radiator shield 24 thus is capable of rocking movement about the hinge 30—31 relative to the tractor. Each of the hinge pins 30 and 31 is provided with a downwardly depending rod or pipe member 30a and 31a which are interlocked by a cross member 30b. Springs 32 are fastened at their one ends at 33 to the rearward and lower edge of the wall 27 and at their forward ends are fastened to the lower ends of the rod members 30a and 31a. The spring 32 thus normally urges the radiator shield 24 to move in a clockwise direction, as viewed in Figure 1, or in a direction to extend the lower forward edge of the front wall 29 outwardly to a substantial sealing relationship with the upper semi-circular rim 35 of the center divider 17. Thus in the operating position of the corn picker, as shown in Figures 1 and 2, there is presented a substantially smooth and uninterrupted surface upwardly over the center divider and up the radiator shield so that corn and corn stalks rushing therepast will have an unbroken surface against which it may be slid or pulled during its deflecting movement into the scope of the corn gathering units at each side of the tractor. In the transport position of the corn picker, as shown in Figures 3 and 4, the picker and the center divider 17 merely move upwardly relative to the radiator shield 24 without any contact therewith.

However, in the device as shown in Figures 5 and 6, the center divider is also capable of pivotal movement about its hinge 36 which is located at the rear and substantially the bottom of the center divider 17. Thus, as the picker rides over irregular ground as shown in Figure 5 wherein it is raised to clear an upward projection in the ground as shown at 37, the center divider 17 will of its own power received by the forward motion of the tractor 10 be raised over the obstruction and follow any ground contour. The arcuate movement of the center divider 17 about its hinge 36 differs substantially from its upward swinging movement about the picker hinge 22. As shown in Figure 5 the center divider abuts the radiator shield 24 causing the shield to move inwardly at its lower edge against the action of the springs 32. Obviously then the springs 32 continue to urge the shield outwardly into contact with the circular rim 35 of the divider 17 so that at no time is there a large gap between the divider and the radiator shield 24 through which corn could be lost. Without the device shown in this invention and merely employing an ordinary non-pivoting, non-spring held radiator shield the center divider 17 would have to be so large at its upper end and spaced so far forwardly of the radiator shield that there would be no contact between the divider and shield when the divider pivoted about its lower forwardly disposed pivot 36. With such a construction there is definitely a large hole or gap between the divider and the shield through which corn may be lost and the efficiency of the corn harvester drops. In the device of the present invention, however, this gapping is entirely eliminated and the center divider and radiator shield 17 and 24, respectively, are in effect an articulated device cooperating with each other so that there is a constant seal between the two elements even though they are pivoted separately about their own pivot points. The spring 32 urging the shield forwardly maintains the shield against the center divider 17 regardless of the inclination of the divider and thereupon creates this desirable situation wherein there is an unbroken surface over which the corn to be harvested passes in entering the corn gathering units.

Various details of construction may be varied throughout a wide range without departing from the principles disclosed herein and we, therefore, do not propose limiting the patent granted hereon otherwise than as necessitated by the appended claims.

What is claimed is:

1. In a tricycle type tractor having a narrow longitudinally extending body supported at its front by a narrow steerable wheel structure and at its rear by widely spaced traction wheels, a harvester mounted on said tractor between one traction wheel and the body and having a forwardly extending gathering unit positioned closely adjacent the body of the tractor and terminating adjacent the steerable wheel structure, a crop raising and deflecting means forming a part of said corn picker and extending around said steerable wheel structure, said crop raising and deflecting means extending forwardly and downwardly for closely following the ground and for engaging crops to be harvested and directing them into the path of the gathering unit, said entire harvester hingedly mounted on said tractor at the rear thereof and said crop raising and deflecting means hingedly mounted on said harvester at substantially the forward end thereof, and the device including a radiator shield hingedly mounted on said tractor in front of the tractor radiator and said crop raising and deflecting means having means sealingly engaging said radiator shield whereby regardless of the angular inclination of the crop raising and deflecting means about its forwardly positioned hinge the radiator shield will substantially seal any opening between the crop raising and deflecting means and the radiator shield.

2. A device as set forth in claim 1, in which said radiator shield is hingedly mounted on a substantially horizontal axis on the tractor for arcuate swinging movement thereof.

3. A device as set forth in claim 2, in which there is included spring means for normally urging said radiator shield forwardly at its lower edge, whereby when the crop raising and deflecting means is swung upwardly about its forwardly disposed hinge, the radiator shield may swing inwardly against the action of the spring means to retain a seal between the crop raising and deflecting means and the shield whereby there is no gap through which crop material may be lost.

4. A device as set forth in claim 1 in which said radiator shield is provided with oppositely disposed inwardly extending rods intermediate the upper and lower ends thereof, and means hingedly mounting said rods on said tractor.

5. A device as set forth in claim 4 in which said rods are each provided with downward extensions, spring means normally urging said radiator shield toward extended positions, and means positioning said spring means between said radiator shield and said downward extension of said rods.

No references cited.